United States Patent [19]
Tsai et al.

[11] Patent Number: 5,527,000
[45] Date of Patent: Jun. 18, 1996

[54] DUPLEX COMPLEMENTARY CARRIER

[76] Inventors: Yeong-Shyeong Tsai; Wang-Jr Li, both of No. 141, Fhhsing Rd., Luchou Hsiang, Taipei Hsien, Taiwan

[21] Appl. No.: 284,118

[22] Filed: Aug. 2, 1994

[51] Int. Cl.⁶ ........................................................ B64F 1/00
[52] U.S. Cl. ................................. 244/116; 244/2; 244/5; 244/110 E; 105/1.2; 104/22
[58] Field of Search ...................... 244/50, 2, 30, 244/110 E, 116, 139, 5; 105/75, 1.2; 104/19, 22

[56] References Cited

U.S. PATENT DOCUMENTS

| | | | |
|---|---|---|---|
| 1,824,346 | 9/1931 | Harison | 244/110 E |
| 1,874,423 | 8/1932 | Belleville . | |
| 2,346,633 | 4/1944 | Bottrill . | |
| 4,102,448 | 7/1978 | Wolbrink et al. | 198/365 |
| 4,665,857 | 5/1987 | Akerman et al. | 244/110 E |
| 4,744,529 | 5/1988 | Clarke | 244/114 R |
| 4,917,329 | 4/1990 | Vollmerhausen | 244/2 |

FOREIGN PATENT DOCUMENTS

| | | | |
|---|---|---|---|
| 415784 | 10/1910 | France | 244/2 |
| 458559 | 5/1913 | France | 244/116 |
| 0182197 | 7/1989 | Japan | 244/2 |
| 3779 | of 1879 | United Kingdom | 244/30 |

*Primary Examiner*—Andres Kashnikow
*Assistant Examiner*—Virna Lissi Mojica
*Attorney, Agent, or Firm*—Leydig, Voit & Mayer

[57] ABSTRACT

A duplex complementary carrier includes a flight vehicle floating above the ground, a control system moving on the ground for controlling movement of the flight vehicle, and a connecting system connecting between the control system and the flight vehicle. When the control system is moving on the ground, the flight vehicle above the ground is able to follow movement of the control system due to the connection provided by the connecting system such that the pressure of the control system on the ground and the frictional force of the ground on the control system are reduced by the buoyancy of the flight vehicle. The flight vehicle is able to move above the ground stably by the directing and guiding effects of the control system.

11 Claims, 3 Drawing Sheets

DUPLEX COMPLEMENTARY CARRIER

BACKGROUND OF THE INVENTION

1. Field of Invention

The present invention relates to a duplex complementary carrier, and more particularly to a duplex complementary carrier which is used to carry a flight vehicle.

2. Related Prior Art

A conventional carrier is heavy and occupies much space, so it exerts great pressure on the ground or on the road, thus easily destroying the structure and configuration of the road. In addition, the carrier is subjected to great frictional force and resistance when moving on the ground, so it requires much power to drive the carrier.

The present invention has arisen to mitigate and/or obviate the above-mentioned disadvantages of the conventional carrier.

SUMMARY OF THE INVENTION

The primary objective of the present invention is to provide a duplex complementary carrier which performs easily and does not occupy much space.

Another objective is to provide a carrier which exerts little pressure on the ground or on the road such that the structure and material required for constructing the road does not play an important role, thereby reducing manufacturing costs.

A further objective is to provide a carrier which is able to drive a flight vehicle to fly stably and steadily.

In accordance with one aspect of the present invention, there is provided a duplex complementary carrier comprising a flight vehicle floating above the ground, a control system moving on the ground for controlling movement of the flight vehicle, and a connecting system connecting the control system and the flight vehicle. When the control system is moving on the ground, the flight vehicle above the ground is able to follow movement of the control system due to the connection provided by the connecting system such that the pressure of the control system on the ground and the frictional force of the ground on the control system are reduced by means of the buoyancy of the flight vehicle, and such that the flight vehicle is able to move above the ground stably by the directing and guiding effects of the control system.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENTS

Figure 1:
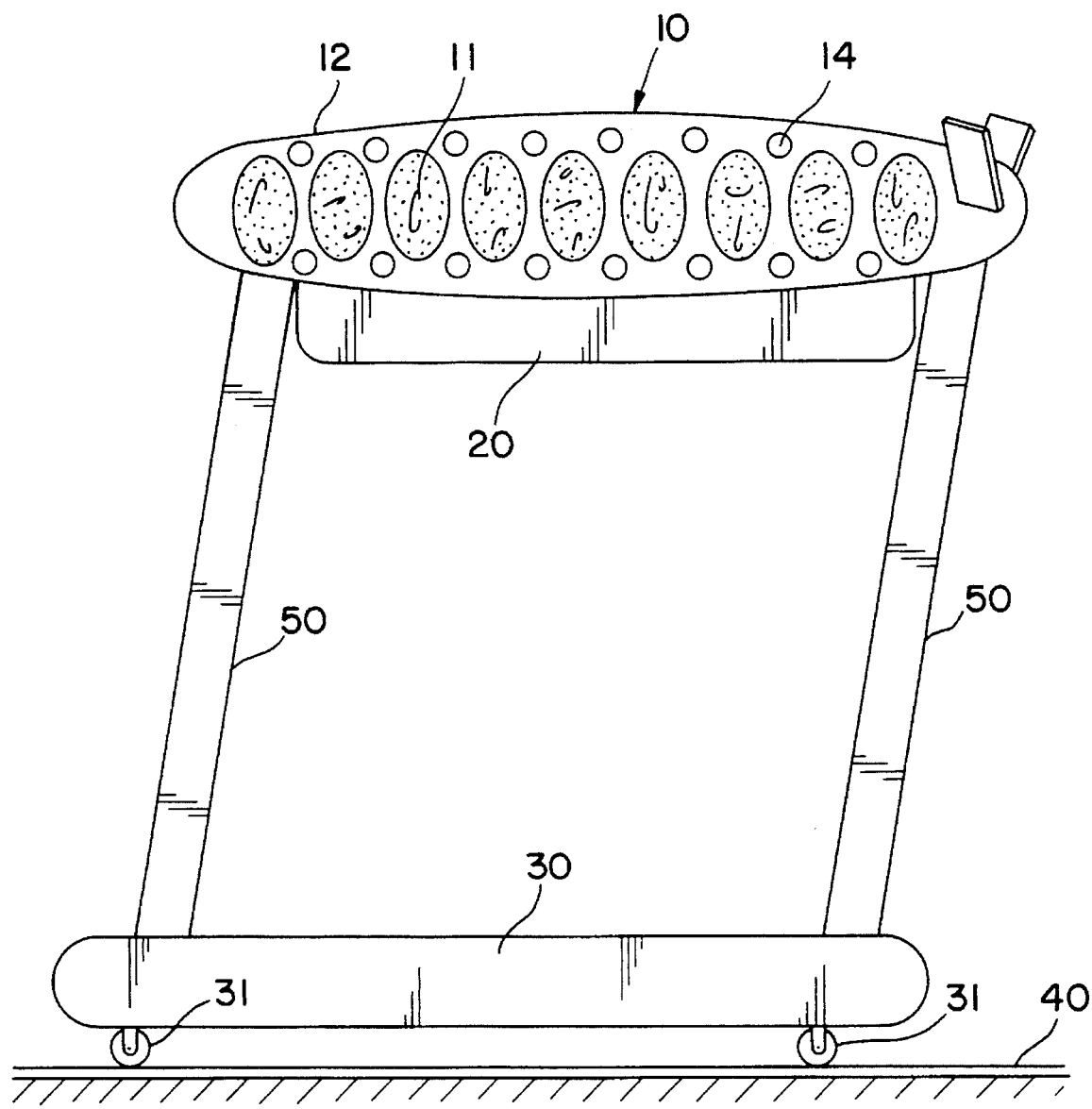
FIG. 1 is a schematic view of a duplex complementary carrier in accordance with a first embodiment of the present invention.

Referring to the drawings, and initially to FIG. 1, a duplex complementary carrier in accordance with a first embodiment of the present invention comprises a flight vehicle 10 floating above the ground for supporting and transporting articles or passengers, a control system 30 moving on the ground for controlling movement of the flight vehicle 10, and a connecting system 50 connecting the control system 30 and the flight vehicle 10. By such an arrangement, when the control system 30 is moving on the ground, the flight vehicle 10 above the ground is able to follow movement of the control system 30 due to the connection provided by the connecting system 50 such that pressure of the control system 30 on the ground and frictional force of the ground on the control system 30 are reduced by means of buoyancy of the flight vehicle 10, and such that the flight vehicle 10 is able to move above the ground stably by the directing and guiding effects of the control system 30. Preferably, the control system 30 has a wheel assembly 31 mounted on an underside thereof moving on a track 40 along a longitudinal direction thereof such that the control system 30 is restricted to steadily move on the track 40. The control system 30 comprises a power supply device (not shown) for driving the control system 30 to move on the track 40, a sensor device (not shown) for detecting directions and velocities of the control system 30 and the flight vehicle 10, a regulating device (not shown) for directing the control system 30, and a communicating apparatus (not shown) for communicating with the flight vehicle 10.

The flight vehicle 10 comprises a body 12 having a plurality of bladders 11 filled with helium mounted therein such that the flight vehicle 10 is able to float above the ground, a chamber 20 mounted on an underside of the body 12 for supporting and transporting articles or passengers, a sensor (not shown) for detecting the flight direction of the flight vehicle 10 and instantaneous velocities thereof, a communicating apparatus (not shown) for communicating with the control system 30, and a plurality of nozzles 14 mounted on the two longitudinal opposite sides of the body 12 for injecting air outwardly so as to stabilize movement of the flight vehicle 10 when the flight vehicle 10 accompanies movement of the control system 30 such that passengers in the flight vehicle 10 can be seated comfortably. The air flow is supplied from a compressor (not shown) in the control system 30 to the nozzles 14 of the flight vehicle 10 through a conduit (not shown) in the connecting system 50.

Figure 2:
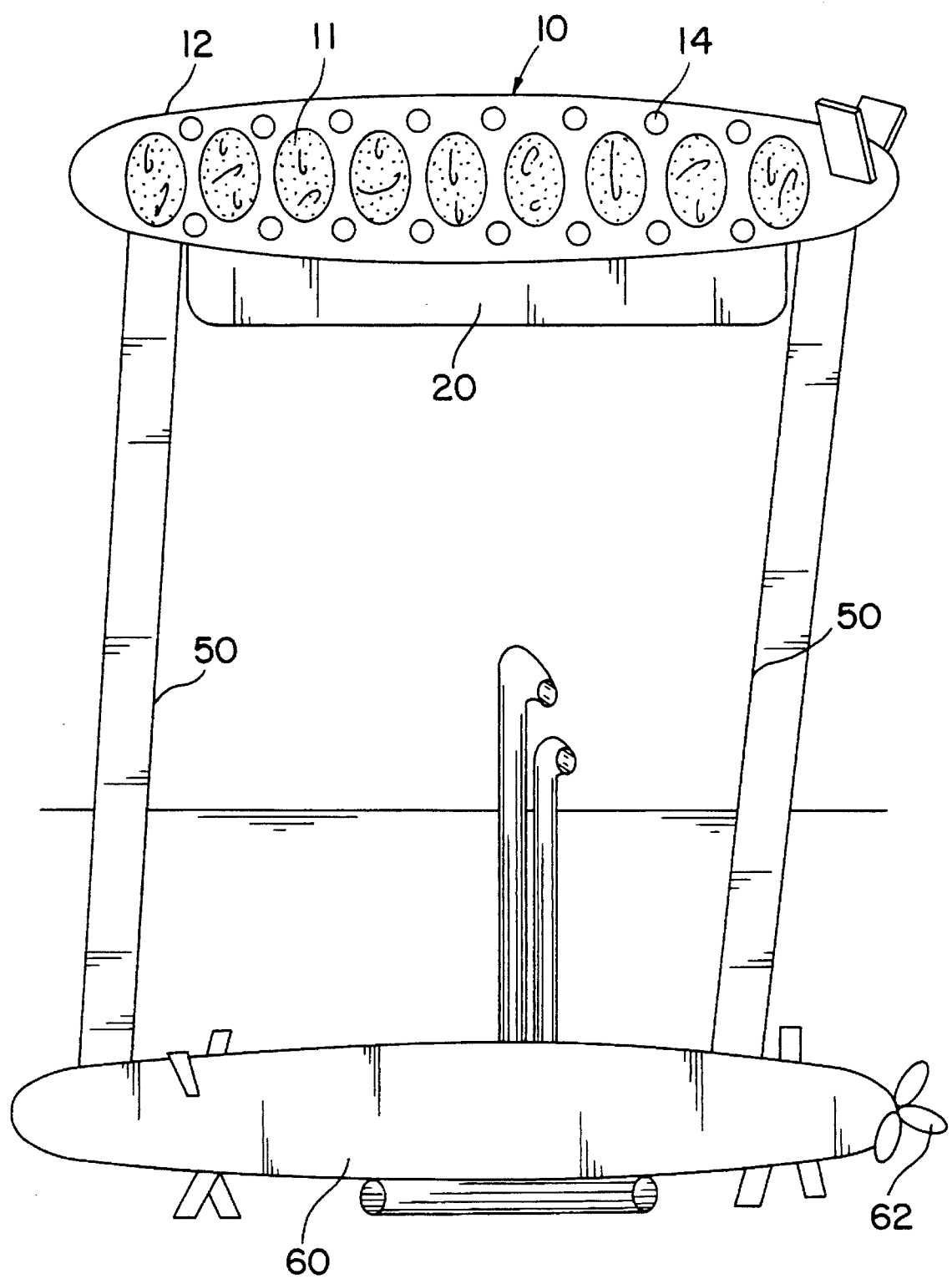
FIG. 2 is a schematic view of a duplex complementary carrier in accordance with a second embodiment of the present invention.

Referring to FIG. 2, in accordance with a second embodiment of the present invention, a control system 60 is moved in the water by means of propeller blades 62 instead of the wheel assembly 31 shown in FIG. 1. The flight vehicle 10 is able to follow movement of the control system 60 due to the connection provided by the connecting system 50 such that the flight vehicle 10 is able to move above the ground stably by directing and guiding of the control system 60 in the water.

Figure 3:
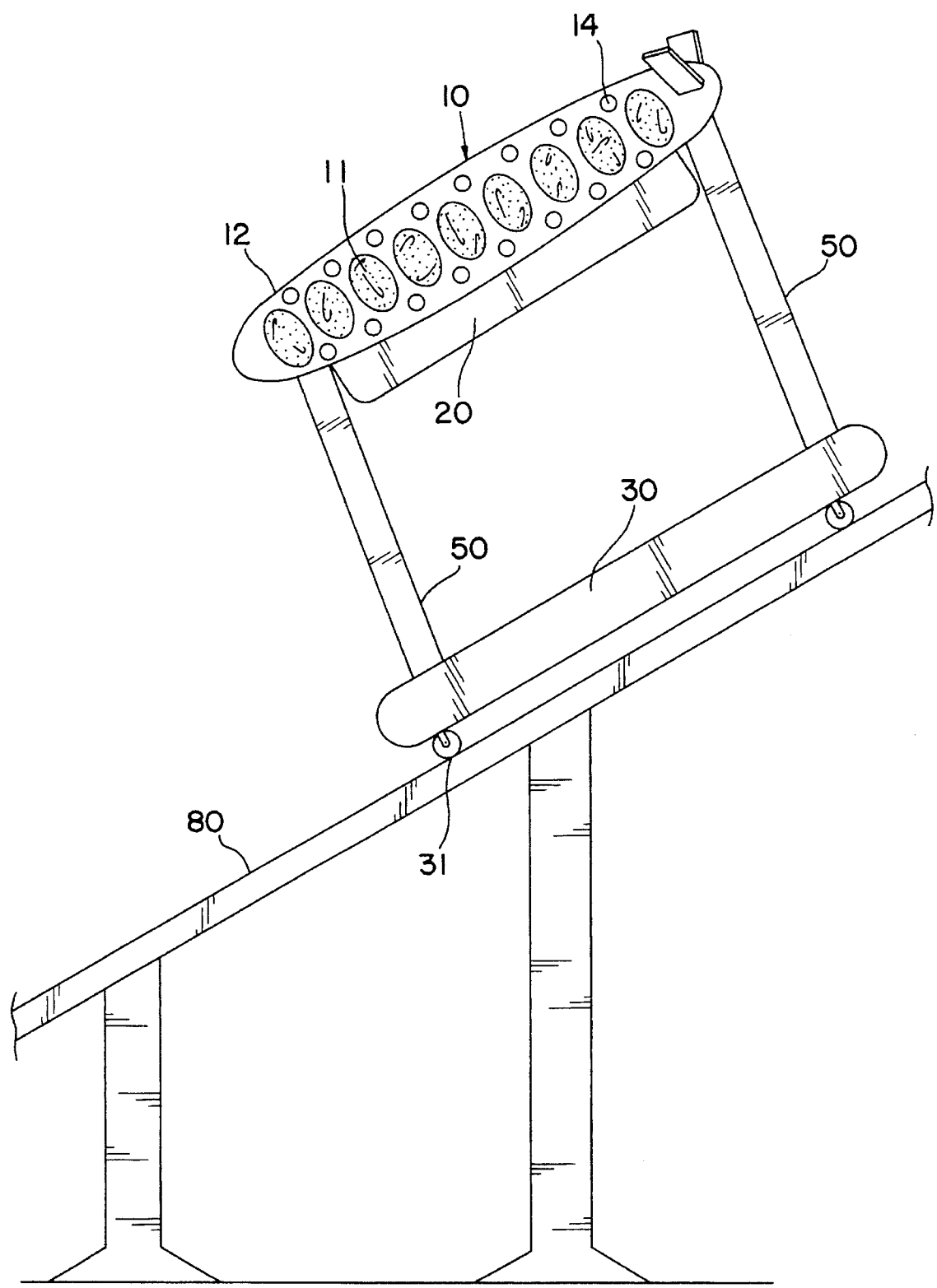
FIG. 3 is a schematic view of a duplex complementary carrier in accordance with a third embodiment of the present invention.

Referring to FIG. 3, in accordance with a third embodiment of the present invention, the control system 30 is able to move on an elevated road or track 80 such that the duplex complementary carrier performs easily and does not occupy much space. In addition, the control system 30 of the carrier exerts little pressure on the elevated road 80 on account of the buoyancy of the flight vehicle 10. Therefore, the structure and material required for constructing the road 80 does not play an important role, thereby reducing manufacturing costs.

It should be clear to those skilled in the art that further embodiments of the present invention may be made without departing from the teachings of the present invention.

I claim:

1. A duplex complementary carrier comprising:

a flight vehicle (10) floating above the ground;

a control system (30) moving on the ground for controlling movement of said flight vehicle (10); and a connecting system (50) connecting between said control system (30) and said flight vehicle (10);

whereby, when said control system (30) is moving on the ground, said flight vehicle (10) is able to follow movement of said control system (30) by connection of said connecting system (50) such that the pressure force of said control system (30) on the ground and the frictional force of the ground on said control system (30) is reduced by means of buoyancy of said flight vehicle (10) on said control system (30), and such that said flight vehicle (10) is able to move above the ground stably by directing and guiding effects of said control system (30).

2. The duplex complementary carrier in accordance with claim 1, wherein said control system (30) is limited to move on an elevated road (80).

3. The duplex complementary carrier in accordance with claim 1, wherein said control system (30) is limited to move on a track (40) along a longitudinal direction thereof.

4. The duplex complementary carrier in accordance with claim 1, wherein said flight vehicle (10) comprises a body (12) having a plurality of bladders (11) filled with helium mounted therein such that said flight vehicle (10) is able to float above the ground, a chamber (20) is mounted on an underside of said body (12) for supporting and transporting articles or passengers, a plurality of nozzles (14) are respectively mounted in two longitudinal opposite sides of said body (12) for injecting air flow outwardly so as to stabilize movement of said flight vehicle (10).

5. The duplex complementary carrier in accordance with claim 4, wherein the air flow is supplied from a compressor in said control system (30) to said nozzles (14) of said flight vehicle (10) through a conduit in said connecting system (50).

6. A duplex complementary carrier comprising:

a flight vehicle having positive buoyancy in air;

a surface vehicle equipped with wheels for running on a support surface beneath the flight vehicle, the surface vehicle being connected to the flight vehicle such that the buoyancy of the flight vehicle exerts an upward force on the surface vehicle to reduce a force of the wheels on the support surface, the weight of the surface vehicle being less than the upward force.

7. A duplex complementary carrier comprising:

a flight vehicle floating above the ground and including a body having a plurality of bladders filled with helium mounted therein such that the flight vehicle is able to float above the ground, a chamber mounted on an underside of the body for supporting and transporting articles or passengers, and a plurality of nozzles respectively mounted on two opposite longitudinal sides of the body for directing air flow outwardly so as to stabilize movement of the flight vehicle;

a control system moving on the ground for controlling movement of the flight vehicle and including a compressor for providing air to the nozzles of the flight vehicle; and a connecting system connecting the control system and the flight vehicle and including a conduit for conveying air from the compressor to the nozzles of the flight vehicle, wherein when the control system is moving on the ground, the flight vehicle is able to follow movement of the control system by connection of the connecting system such that the pressure of the control system on the ground and the frictional force of the ground on the control system is reduced by means of buoyancy of the flight vehicle on the control system, and such that the flight vehicle is able to move above the ground stably by directing and guiding effects of the control system.

8. A duplex complementary carrier in accordance with claim 7 wherein the control system is limited to move on an elevated road.

9. The duplex complementary carrier in accordance with claim 8 wherein the flight vehicle includes chambers filled with a gas less dense than air.

10. The duplex complementary carrier in accordance with claim 8 wherein the surface vehicle is self-propelled.

11. The duplex complementary carrier in accordance with claim 8 including a plurality of maneuvering nozzles mounted on the flight vehicle and a source of compressed air disposed on the surface vehicle and fluidly connected with the nozzles.

* * * * *